(12) United States Patent
Christensen et al.

(10) Patent No.: US 12,370,750 B2
(45) Date of Patent: *Jul. 29, 2025

(54) HOT MELT APPARATUS AND METHOD OF USE

(71) Applicant: Oceaneering International, Inc., Houston, TX (US)

(72) Inventors: Marc Christensen, Friendswood, TX (US); Peter Carow, Pearland, TX (US); Eric Curley, League City, TX (US); Andrew Curtis, Seabrook, TX (US); James Stein, Houston, TX (US); Lee Vyoral, League City, TX (US); Michael M Withey, Seabrook, TX (US)

(73) Assignee: Oceaneering International, Inc., Houston, TX (US)

( * ) Notice: Subject to any disclaimer, the term of this patent is extended or adjusted under 35 U.S.C. 154(b) by 460 days.

This patent is subject to a terminal disclaimer.

(21) Appl. No.: 17/133,295

(22) Filed: Dec. 23, 2020

(65) Prior Publication Data

US 2021/0114311 A1 Apr. 22, 2021

Related U.S. Application Data

(63) Continuation of application No. 16/037,930, filed on Jul. 17, 2018, now Pat. No. 10,987,875.

(51) Int. Cl.
*B29C 65/48* (2006.01)
*B29C 65/52* (2006.01)
*F16B 11/00* (2006.01)

(52) U.S. Cl.
CPC ...... *B29C 65/4855* (2013.01); *B29C 65/4815* (2013.01); *B29C 65/525* (2013.01); *F16B 11/006* (2013.01)

(58) Field of Classification Search
CPC ........... B29C 65/4855; B29C 65/4815; B29C 65/525; F16B 11/006
See application file for complete search history.

(56) References Cited

U.S. PATENT DOCUMENTS 10,987,875 B2 * 4/2021 Christensen ........ B29C 65/4815
2021/0114310 A1 * 4/2021 Christensen ........ B29C 65/4855

* cited by examiner

*Primary Examiner* — Daniel McNally
(74) *Attorney, Agent, or Firm* — Maze IP Law, P.C.

(57) ABSTRACT

In various embodiments, a hot melt device comprising a heating device that is automatically or manually triggered is configured so as to have its melt surface applied bringing a thermoplastic material in its solid form into contact with a surface via mechanical extrusion; using a heater to heat the thermoplastic material to a temperature above a melting temperature of the thermoplastic material while maintaining the contact of the thermoplastic material with the surface; allowing the heated thermoplastic material to cool to a temperature that is below the thermoplastic material's melting temperature; and allowing the heated thermoplastic material to bond the hot melt apparatus to the contacted surface without a solvent or use of a curing chemical reaction when the heated thermoplastic material is cooled to below the thermoplastic material's melting temperature while remaining connected to the structural body.

22 Claims, 7 Drawing Sheets

HOT MELT APPARATUS AND METHOD OF USE

RELATION

This application is a continuation of U.S. application Ser. No. 16/037,930 filed on 17 Jul. 2018 and claims priority through U.S. Provisional Application 62/533,608, filed Jul. 17, 2017.

BACKGROUND OF THE INVENTION

A hot melt device comprising a heating device that is automatically or manually triggered to heat a pre-formed thermoplastic feedstock is recognized as an existing technology. Applications using such devices allow connection of objects to provide mechanical and/or electrical bonding and incorporate flexibility, repeatability and reusability of the connections.

A hot melt apparatus typically includes a structural body, a heating element of various designs, and an automatic or manual control system to melt thermoplastic materials. In operation, mechanical extrusion of a heated thermoplastic material onto a surface to be joined as the thermoplastic material cools and solidifies is used.

FIGURES

Various figures are included herein which illustrate aspects of embodiments of the disclosed inventions.

DESCRIPTION OF EXEMPLARY EMBODIMENTS

Figure 1:
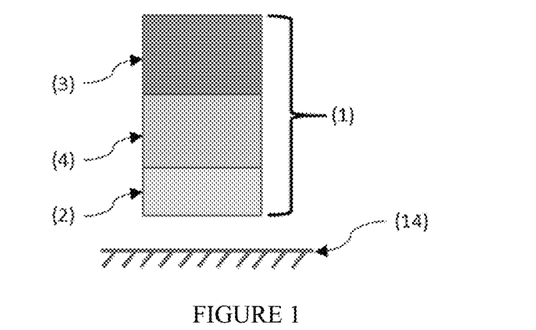
FIG. 1 is a block diagrammatic view in partial perspective of a first exemplary system.

Referring now to FIG. 1, in a first embodiment hot melt apparatus 1 comprises structural body 3; thermoplastic material 2, in a solid form, connected to structural body 3, where the solid form thermoplastic material 2 is mechanically extrudable onto a surface to be joined as the heated solid form thermoplastic material 2 cools and solidifies; and controllable heater 4 connected to the structural body and to the solid form thermoplastic material 2, heater 4 controllable to heat the solid form thermoplastic material 2 to a temperature above its melting temperature and to allow the heated solid form thermoplastic material 2 to cool and solidify without the use of a solvent.

Figure 2:
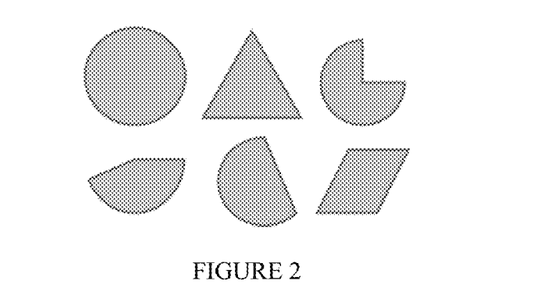
FIG. 2 is an illustration of various shapes adapted to improve a bond of thermoplastic material 2 with a contacted surface.

Referring additionally to FIG. 2, solid form thermoplastic material 2 may comprise a shaped thermoplastic material 2, where the shape is adapted to improve a bond of thermoplastic material 2 with a the contacted surface. By way of example and not limitation, the shape may comprises a geometric profile and/or pattern and may further comprise varying thicknesses when melted wherein the connection of rough or uneven surfaces are completed.

Heater 4 may be an electro-chemical heater activated using a low power electrical signal. In other embodiments, heater 4 may be chemical based and activated through mixing of various chemicals.

Figure 3:
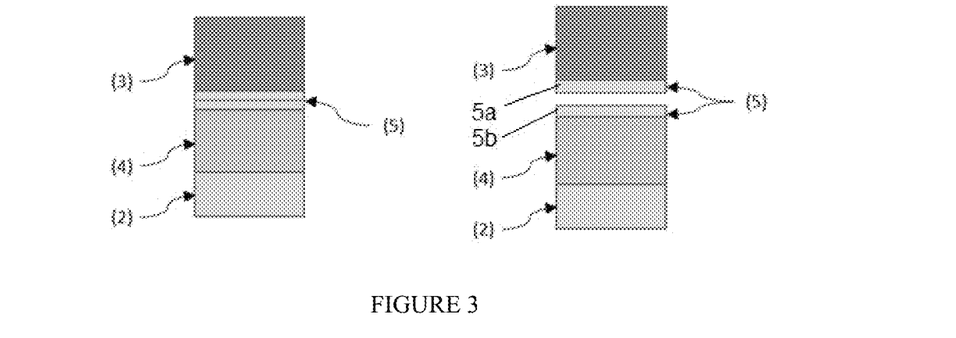
FIG. 3 is a block diagrammatic view in partial perspective of a second exemplary system where one or more interchangeable interfaces 5 are disposed intermediate structural body 3 and heater 4 and comprises upper portion 5a connected to structural body 3 and lower portion 5b connected to heater 4, where upper portion 5a and lower portion 5n are selectively disconnectable from each other.

Referring additionally to FIG. 3, in embodiments hot melt apparatus 1 may further comprise one or more interchangeable interfaces 5 disposed intermediate structural body 3 and heater 4. Interchangeable interface 5 may comprises upper portion 5a connected to structural body 3 and lower portion 5b connected to heater 4, where upper portion 5a and lower portion 5n are selectively disconnectable from each other. In some of these embodiments, heater 4 and thermoplastic material 2 are integral and may be integrated to, but remain separable from, structural body 3.

Figure 4:
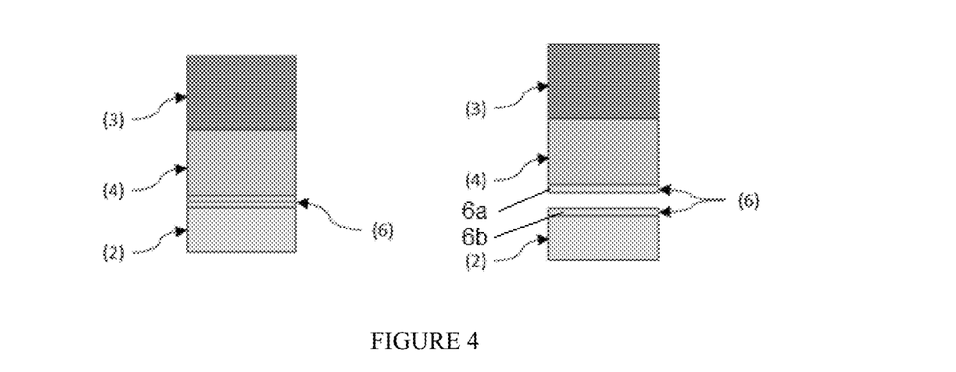
FIG. 4 is a block diagrammatic view in partial perspective of a further exemplary system illustrating a separable interface.

Referring additionally to FIG. 4, in embodiments separable interface 6 is present and disposed intermediate heater 4 and thermoplastic material 2. Typically, separable interface 6 is adapted to create an evenly distributed thermal transfer of heat into thermoplastic material 2. Separable interface 6 comprises a metal, a plastic, a ceramic, or a composite, or the like, or a combination thereof.

In certain of these embodiments, separable interface 6 comprises upper portion 6a connected to heater 4 and lower portion 6b selectively detachable from upper portion 6a, where lower portion 6b is substantially permanently attached to thermoplastic material 2.

In embodiments separable interface 6 further comprises a thermally conductive material and a heating element operative to melt thermoplastic material by transferring heat to the hot melt pad.

In other embodiments, separable interface 6 comprises an electrically conductive material and the hot melt pad comprises a heater. For some of these embodiments, separable interface 6 further comprises an electrically conductive separable interface configured to provide a grounding path through the hot melt apparatus.

Figure 5:
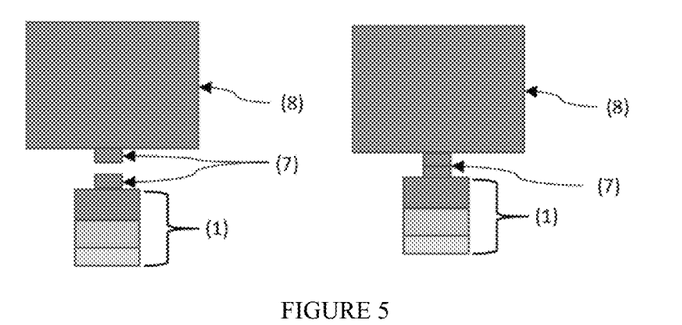
FIG. 5 is a block diagrammatic view in partial perspective of a further exemplary system illustrating a mechanical integrator.
Figure 7:
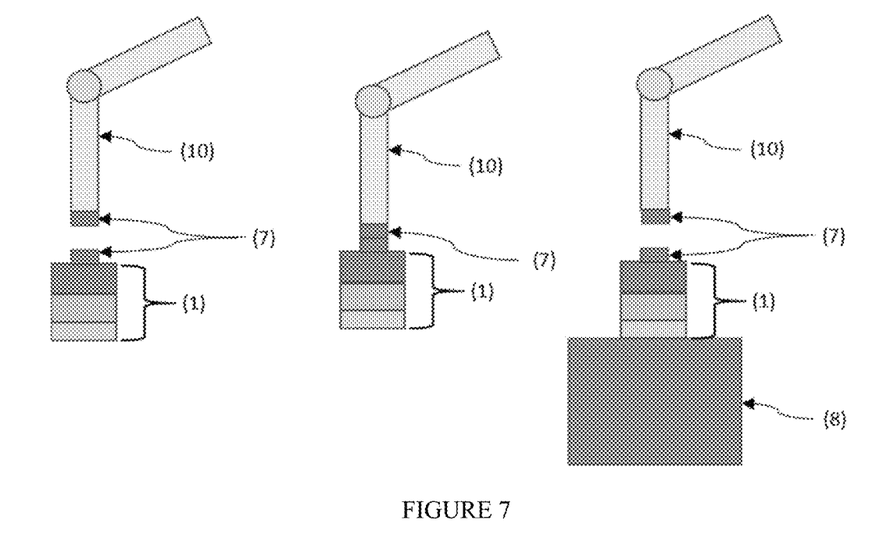
FIG. 7 is a block diagrammatic view in partial perspective of a further exemplary system illustrating a mechanical integrator.

Referring additionally to FIGS. 5 and 7, in further embodiments hot melt apparatus 1 comprises mechanical integrator 7 which is configured to allow hot melt apparatus 1 to be mechanically integrated to object 8 such as to become a tool or structural extension of object 8.

Figure 6:
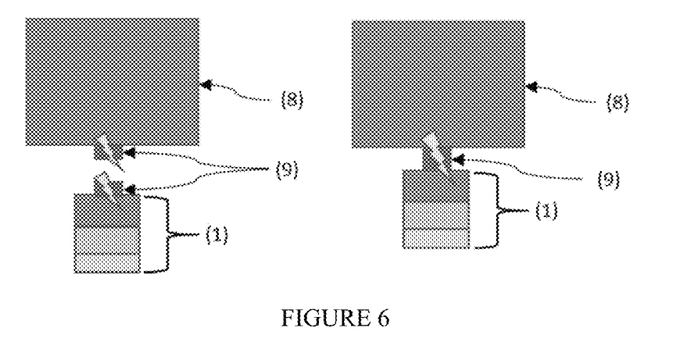
FIG. 6 is a block diagrammatic view in partial perspective of a further exemplary system illustrating an electrical integrator.
Figure 10:
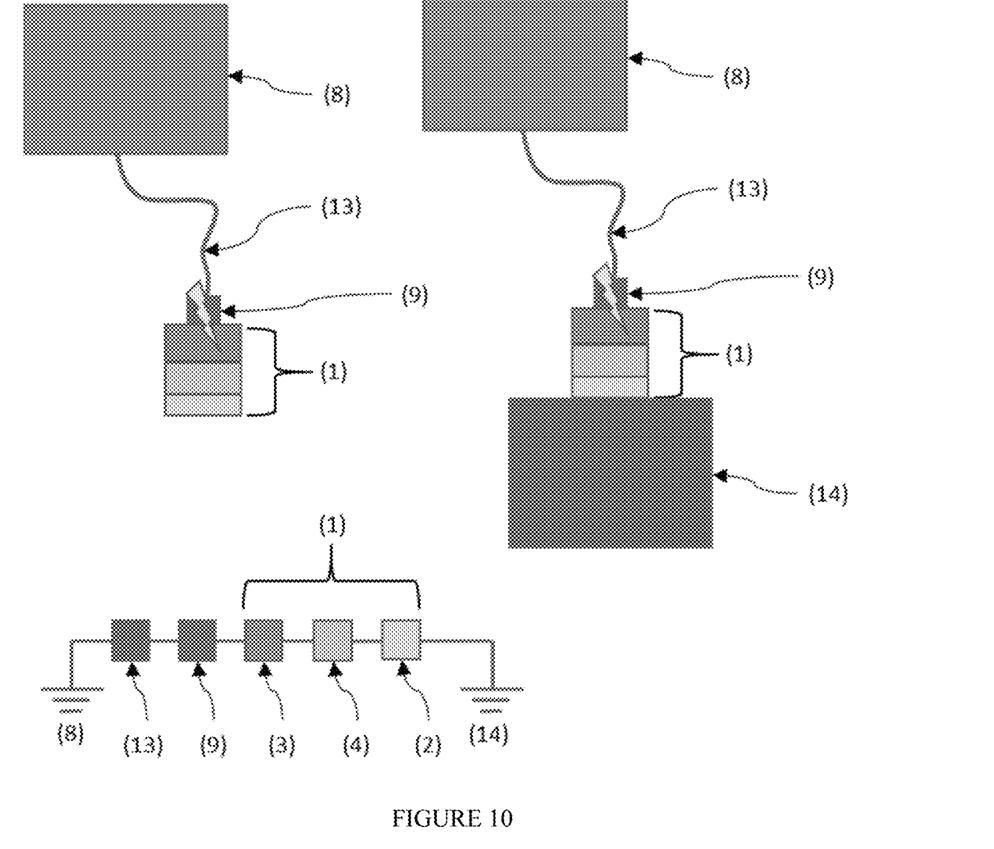
FIG. 10 is a block diagrammatic view in partial perspective of a further exemplary system illustrating an electrical integrator and various electrical ground paths.

Referring additionally to FIGS. 6 and 10 in further embodiments hot melt apparatus 1 comprises electrical integrator 9 which is configured to allow hot melt apparatus 1 to be electrically integrated to object 8. Electrical integrator 9 provides a power and/or a ground path where power, and/or a ground, may be obtained from object 8 to support the operation of hot melt apparatus 1. Electrically conductive cable 13 may also be present in such embodiments and operatively in communication with electrical integrator 9 at a first end and with object 8 at a second end. Electrically conductive cable 13 may be used to implement an electrical ground path between object 8 and secondary object 14 (FIG. 10).

Figure 11:
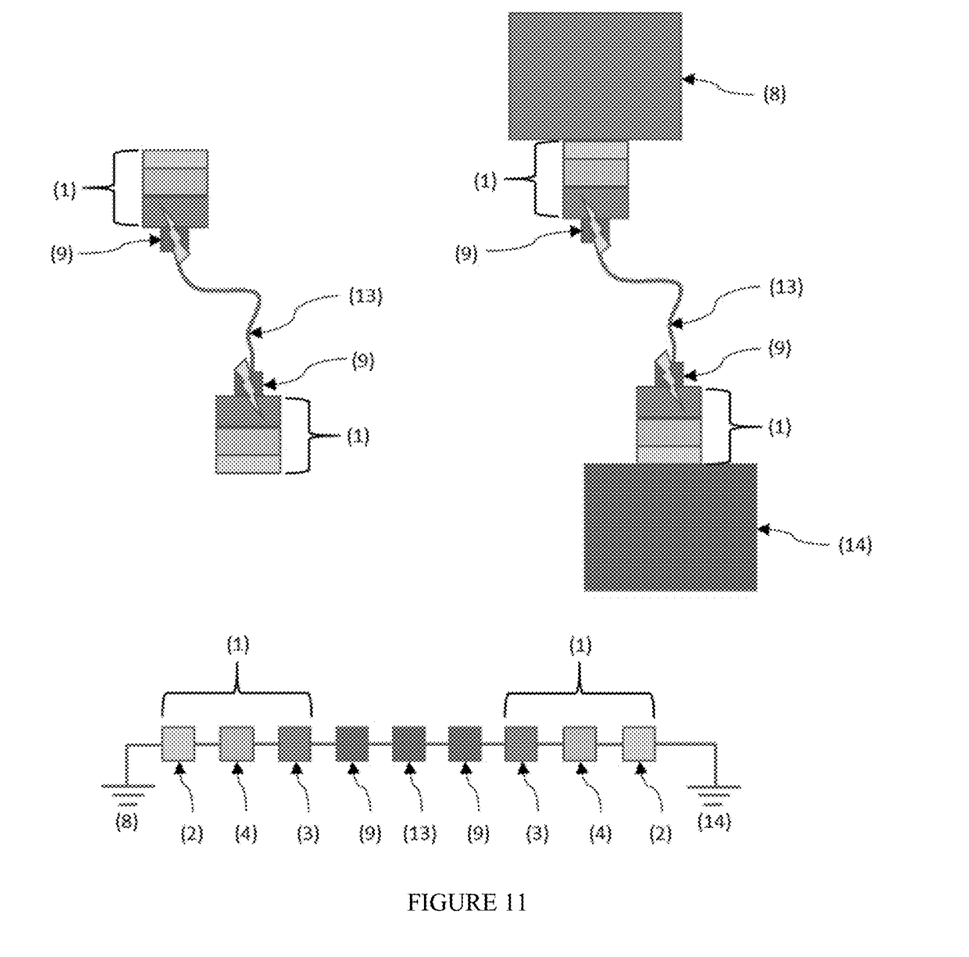
FIG. 11 is a block diagrammatic view in partial perspective of a further exemplary system.

Referring additionally to FIG. 11, in embodiments comprising a pair of hot melt apparatuses 1, electrical integrators 9 of the pair of hot melt apparatuses 1 may be operatively connected by electrically conductive cable 13 which may further be operative to create an electrical ground path when the pair of hot melt apparatuses 1 are bonded separately to object 8 and secondary object 14.

In other embodiments where there is a plurality of hot melt apparatuses 1, the plurality of hot melt apparatuses 1 may be connected by mechanical integrators 7 and electrical integrators 9 and one or more of the plurality of hot melt apparatuses 1 used to bond object 8 to secondary object 14. These multiple hot melt apparatus 1 may be integrated in a number equal to the number of objects 8,14 to be joined. The plurality of paired hot melt apparatuses may be equal in number to a number of objects 8 to be joined.

Figure 13:
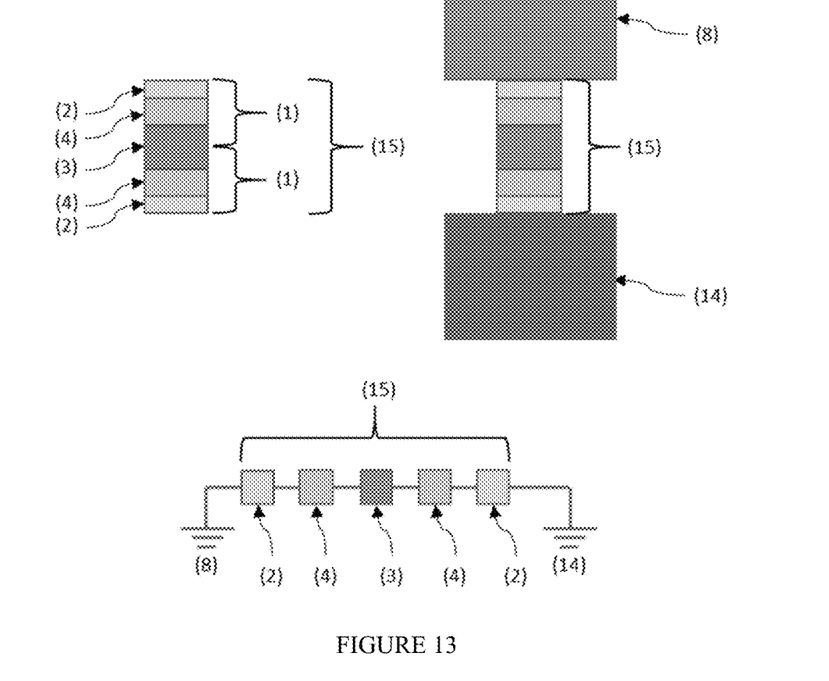
FIG. 13 is a block diagrammatic view in partial perspective of a further exemplary system integrated within a common structural body 3 with thermoplastic material 2 at both ends to create a double sided hot melt apparatus 15.

Referring additionally to FIG. 13, the plurality of hot melt apparatus 1, which may be a pair, may further be integrated within a common structural body 3 with thermoplastic material 2 at both ends to create a double sided hot melt apparatus 15 which may be used to bond object 8 to secondary object 14. Double sided hot melt apparatus 15 may achieve an electrical ground path between object 8 and secondary object 14.

Figure 9:
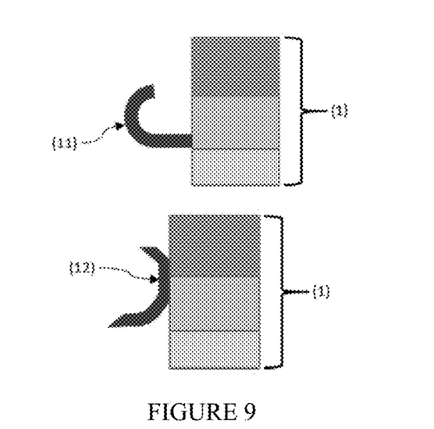
FIG. 9 is a block diagrammatic view in partial perspective of a further exemplary system illustrating use of a cable manager.

Referring additionally to FIG. 9, for embodiments with cables, cable manager 11 may be present and operatively connected to hot melt apparatus 1, where cable manager 11 is configured to provide positioning, placement and retention of cables, ropes, or tethers. In certain embodiments, cable manager 11 comprises a hook shape.

Still referring to FIG. 9, in one or more embodiments hot melt apparatus 1 further comprises material manager 12 operatively connected to hot melt apparatus 1. Material manager 12 may comprise a plow or similar shape to aid in providing for the movement, lifting, and retention of moveable surface materials of object 8.

In most of these embodiments, thermoplastic material 2 may comprise an electrically conductive material which may further provide a grounding path through thermoplastic material 2.

Figure 14:
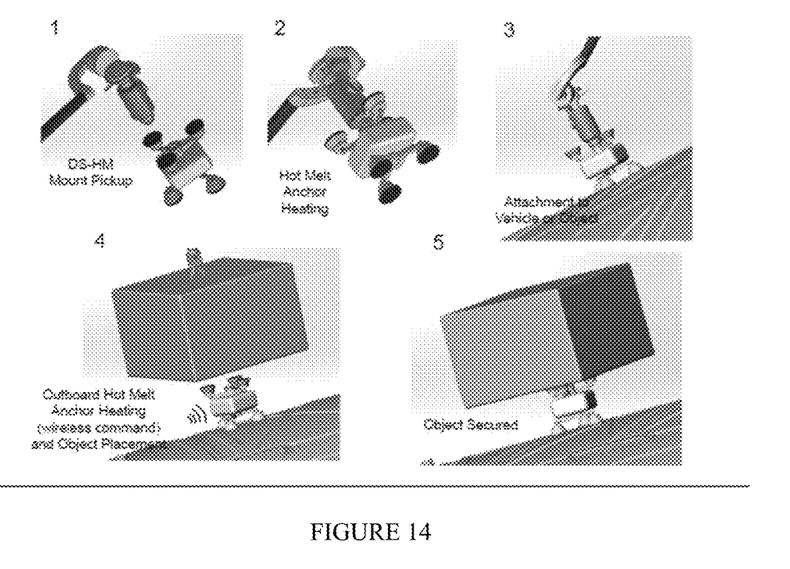
FIG. 14 is a view in partial perspective of an exemplary system illustrating that system in use.

In the operation of exemplary embodiments, referring generally to FIG. 14, a thermoplastic material may be applied to a surface using hot melt apparatus 1 as described above in its various embodiments, where the various embodiments and their application methods illustrate a departure from the current art.

Thermoplastic material 2 is brought in its solid form into contact with a surface via mechanical extrusion of thermoplastic material 2 and heater 4 used to heat thermoplastic material 2 to a temperature at or above a melting temperature of thermoplastic material 2 while maintaining the contact of thermoplastic material 2 with the surface. Thermoplastic material 2 may be electrically conductive and providing a grounding path through the electrically conductive thermoplastic material 2.

Once applied, heated thermoplastic material 2 is allowed to cool to a temperature that is below thermoplastic material's 2 melting temperature and the heated thermoplastic material 2 allowed to bond hot melt apparatus 1 to the contacted surface 14 without a solvent or use of a curing chemical reaction when the heated thermoplastic material 2 is cooled to below the melting temperature of thermoplastic material 2.

Thermoplastic material 2 in solid form may further comprise a predetermined shape selected to comprise as shape that improves the bond of thermoplastic material 2 with the contacted surface. The shape typically comprises a predetermined geometric pattern. Where the surface comprises a rough or uneven surface, the method may further comprise varying a thickness of the selected shape of thermoplastic material 2 wherein the connection of rough or uneven surfaces are completed.

If present, as illustrated in FIG. 4, separable interface 6 may be disposed intermediate heater 4 and thermoplastic material 2, where separable interface 6 comprises upper portion 6a connected to heater 4 and lower portion 6b selectively attachable and detachable from upper portion 6a which is substantially permanently attached to thermoplastic material 2. In such embodiments, separable interface 6 may be used to create an evenly distributed thermal transfer of heat into thermoplastic material 2.

In embodiments comprising mechanical integrator 7 and referring generally to FIG. 5, hot melt apparatus 1 may be mechanically integrated onto and/or in to object 8 using mechanical integrator 7 to become a tool or structural extension of object 8.

In other embodiments, hot melt apparatus 1 may be temporarily attached to placement device 10 using mechanical integrator 7 and subsequently disconnected from placement device 10 after a bond comprising thermoplastic material 2 is created to object 8.

Figure 8:
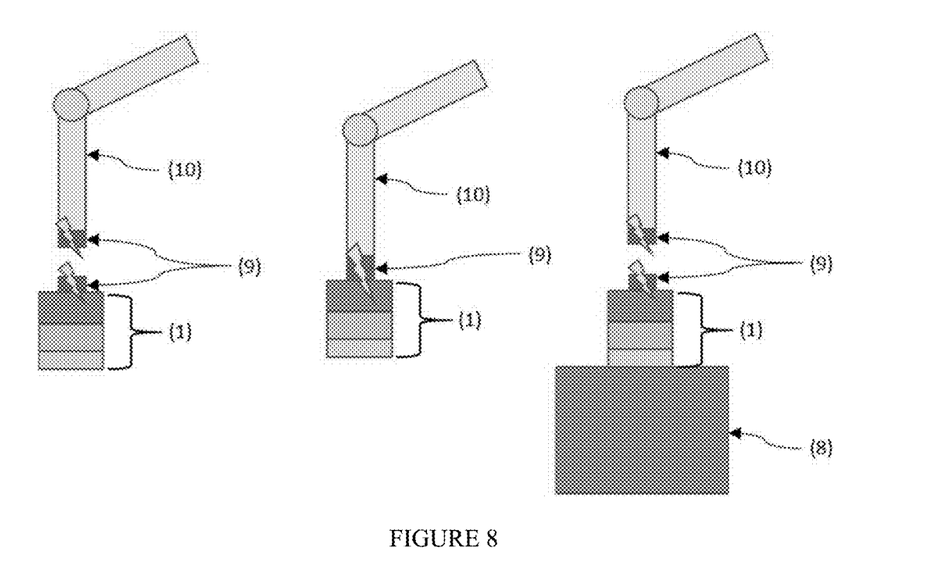
FIG. 8 is a block diagrammatic view in partial perspective of a further exemplary system illustrating a mechanical integrator and an electrical integrator.

In embodiments where hot melt apparatus 1 further comprises electrical integrator 9, and as generally illustrated in FIG. 8, hot melt apparatus 1 may be electrically integrated with object 8 using electrical integrator 9 and one or more electrical pathways provided from object 8 to support the operation of hot melt apparatus 1. This may include temporarily attaching hot melt apparatus 1 to placement device 10 using electrical integrator 9 disconnecting placement device 10 from hot melt apparatus 1 after a bond comprising thermoplastic material 2 is created to object 8.

In embodiments comprising a plurality of hot melt apparatuses 1, and as generally illustrated in FIG. 11, one or more electrically conductive cables 13 may be used to operatively interconnect electrical integrator 9 of a first hot melt apparatus 1 of the plurality of hot melt apparatuses 1 to electrical integrator 9 a second hot melt apparatus 1 of the plurality of hot melt apparatuses 1. Additionally, one or more electrical ground paths may be created through electrically conductive cable 13 when one or more of the plurality of hot melt apparatuses 1 are bonded separately to object 8 and, optionally, secondary object 14. In other of these embodiments, two or more of the plurality of hot melt apparatuses 1 may be interconnected by mechanical integrators 7 and electrical integrators 9 and used to bond object 8 to secondary object 1.

Figure 12:
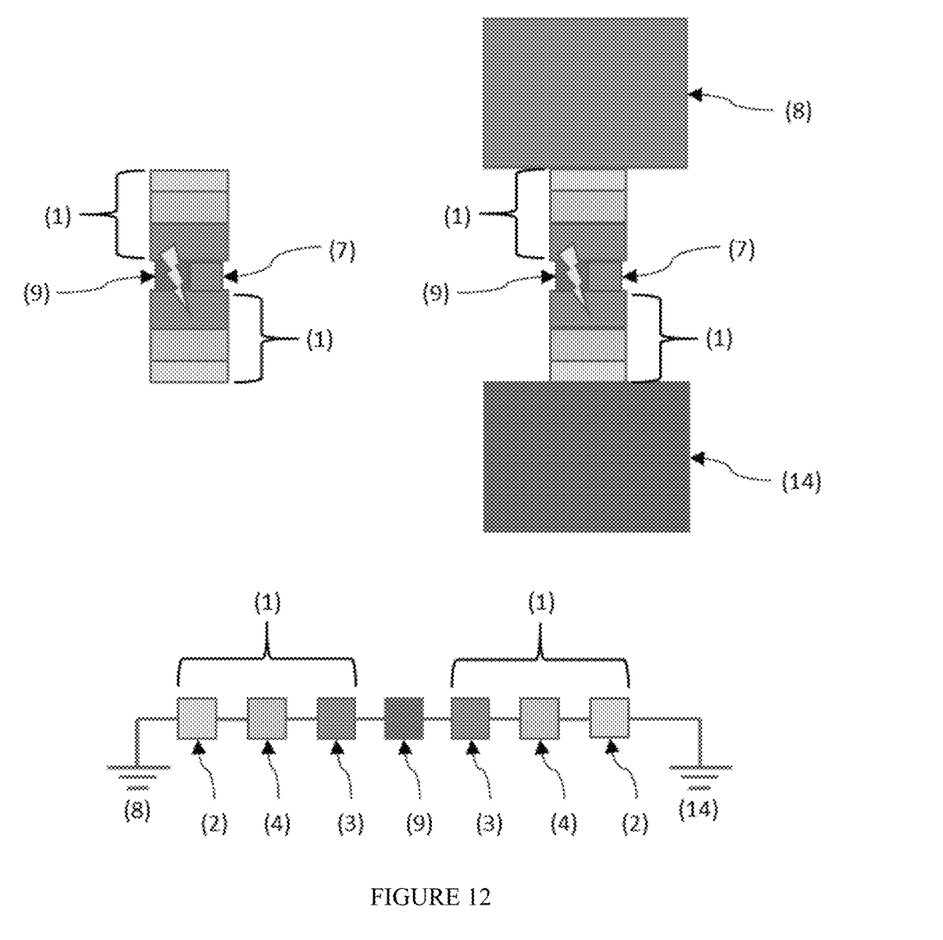
FIG. 12 is a block diagrammatic view in partial perspective of an exemplary system.

In other contemplated embodiments, and as generally illustrated in FIGS. 12 and 13, two or more hot melt apparatus 1 may be integrated within a common structural body 3 with thermoplastic material 2 at both ends to create a double-sided hot melt apparatus 15. The double-sided hot melt apparatus 15 may be used to bond object 8 to secondary object 14.

Where heater 4 comprises an electro-chemical heater, heater 4 may be activated using a low power electrical signal.

Where heater 4 comprises a chemical based heater, heater 4 may be activated through mixing of chemicals in heater 4.

In most of the contemplated embodiments, cooled thermoplastic material 2 may be reheated to allow removal of hot melt apparatus 1 from surface to which the thermoplastic material 2 has been bonded. In these embodiments, multiple heating and cooling cycles of hot melt apparatus 1 may be allowed, further allowing use and reuse of hot melt apparatus 1 multiple times.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A hot melt apparatus, comprising:
   a. a structural body;
   b. an extrudable, solid form thermoplastic material comprising a mechanically extrudable, solid form thermoplastic material which is extrudable onto a surface to be joined when the solid form thermoplastic material is heated and which solidifies while remaining connected to the structural body as the heated solid form thermoplastic material cools;
   c. a controllable heater connected to the structural body and to the solid form thermoplastic material, the controllable heater comprising a heat generator adapted to actively heat the solid form thermoplastic material to a temperature above its melting temperature and to actively cool to a temperature which allows the heated solid form thermoplastic material to cool and solidify without the use of a solvent; and
   d. a separable interface disposed intermediate the solid form thermoplastic material and the controllable heater, the controllable heater and the solid form thermoplastic material integral with and selectively disconnectable to the structural body, the separable interface comprising an upper portion connected to the controllable heater and a lower portion connected to the solid form thermoplastic material and to the upper portion, the upper portion and the lower portion selectively disconnectable from each other.

2. The apparatus of claim 1, further comprising an electrical integrator configured to allow the hot melt apparatus to be electrically integrated to an object and provide an electrical pathway to be established with the object to support the operation of the hot melt apparatus.

3. The apparatus of claim 2, further comprising an electrically conductive cable operatively in communication with the electrical integrator of the hot melt apparatus at a first end and with the object at a second other end, the electrically conductive cable operative to create an electrical ground path between the object and a secondary object.

4. The apparatus of claim 3 further comprising a pair of the hot melt apparatuses whose electrical integrators are operatively interconnected by an electrically conductive cable, the electrically conductive cable operative to create an electrical ground path when the pair of hot melt apparatuses are bonded separately to the object and the secondary object.

5. The hot melt apparatus of claim 1, wherein the solid form thermoplastic material further comprises a shape adapted to improve a bond of the thermoplastic material when the solid form thermoplastic material is joined with the surface.

6. The hot melt apparatus of claim 5, wherein the shape comprises a geometric profile comprising a varying thickness of melted thermoplastic material.

7. The apparatus of claim 5 wherein the solid form thermoplastic material comprises an electrically conductive material able to provide a grounding path through the thermoplastic material.

8. The hot melt apparatus of claim 1, further comprising a cable manager operatively connected to the hot melt apparatus, the cable manager configured to provide positioning, placement and retention of cables, ropes, or tethers.

9. The hot melt apparatus of claim 8, wherein the cable manager comprises a hook shape.

10. The hot melt apparatus of claim 1, further comprising a material manager operatively connected to the hot melt apparatus.

11. The hot melt apparatus of claim 10, wherein the material manager comprises a plow shape configured to aid in providing for movement, lifting, and retention of moveable surface materials of the object.

12. The apparatus of claim 1, wherein the separable interface is adapted to create an evenly distributed thermal transfer of heat into the thermoplastic material.

13. The apparatus of claim 1, wherein the separable interface comprises a thermally conductive material, a thermally non-conductive material, an electrically conductive material, or an electrically non-conductive material.

14. The apparatus of claim 1, wherein the separable interface comprises a metal, a plastic, or a ceramic.

15. The apparatus of claim 1, further comprising a mechanical integrator configured to allow the hot melt apparatus to be mechanically integrated to an object to become a tool or structural extension of the object.

16. The apparatus of claim 1 wherein the controllable heater comprises an electro-chemical heater activated using a low power electrical signal.

17. The apparatus of claim 1 wherein the controllable heater comprises a chemical-based heater activated through mixing of chemicals.

18. A double-sided hot melt apparatus, comprising:
   a. a shared structural body comprising a first end and second end; and
   b. a pair of hot melt apparatuses, each hot melt apparatus comprising:
      i. an extrudable, solid form thermoplastic material comprising a mechanically extrudable,. solid form thermoplastic material which is extrudable onto a surface to be joined when the solid form thermoplastic material is heated and which solidifies while remaining connected to the structural body as the heated solid form thermoplastic material cools;
      ii. a controllable heater connected to the shared structural body and to the solid form thermoplastic material, the controllable heater comprising a heat generator able to heat the solid form thermoplastic material to a temperature above its melting temperature and able to cool to a temperature which allows the heated solid form thermoplastic material to cool and solidify without the use of a solvent; and iii. a separable interface disposed intermediate the solid form thermoplastic material and the controllable heater, the controllable heater and the solid form thermoplastic material integral and selectively disconnectable to the structural body, the separable interface comprising an upper portion connected to the controllable heater and a lower portion connected to the solid form thermoplastic material and to the upper portion, the upper portion and the lower portion selectively disconnectable from each other.

19. The double-sided hot melt apparatus of claim 18, wherein the double-sided hot melt apparatus creates an electrical ground path between the surface and a secondary object when joined to the surface.

20. A system of double-sided hot melt apparatuses, comprising:
   a. a plurality of double-sided hot melt apparatuses, each double-sided hot melt apparatus comprising:
      i. a shared structural body comprising a first end and second end; and
      ii. a pair of hot melt apparatuses, each hot melt apparatus comprising:
         1. an extrudable, solid form thermoplastic material comprising a mechanically extrudable, solid form thermoplastic material which is extrudable onto a surface to be joined when the solid form thermoplastic material is heated and which solidifies while remaining connected to the structural body as the heated solid form thermoplastic material cools;
         2. a controllable heater connected to the shared structural body and to the solid form thermoplastic material, the controllable heater comprising a heat generator adapted to actively heat the solid form thermoplastic material to a temperature above its melting temperature and adapted to actively cool to a temperature which allows the heated solid form thermoplastic material to cool and solidify without the use of a solvent; and
         3. a separable interface disposed intermediate the solid form thermoplastic material and the controllable heater, the controllable heater and the solid form thermoplastic material integral and selectively disconnectable to the structural body, the separable interface comprising an upper portion connected to the controllable heater and a lower portion connected to the solid form thermoplastic material and to the upper portion, the upper portion and the lower portion selectively disconnectable from each other; and
   b. an integrator connected to the shared structural body and adapted to connect the double-sided hot melt apparatuses to a further structure.

21. The system of double-sided hot melt apparatuses of claim 20, wherein the integrator comprises a mechanical integrator or an electrical integrator.

22. The system of double-sided hot melt apparatuses of claim 20, wherein the number of the plurality of hot melt apparatuses corresponds to a number of objects to be joined.

* * * * *